United States Patent
Chatterjee et al.

(10) Patent No.: US 7,916,006 B2
(45) Date of Patent: Mar. 29, 2011

(54) JUDGMENT LINE CALCULATIONS FOR A VEHICLE SAFETY SYSTEM

(75) Inventors: Aamrapali Chatterjee, Okemos, MI (US); Paul R. Williams, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 266 days.

(21) Appl. No.: 12/145,638

(22) Filed: Jun. 25, 2008

(65) Prior Publication Data

US 2009/0322500 A1 Dec. 31, 2009

(51) Int. Cl.
*B60Q 1/00* (2006.01)

(52) U.S. Cl. ......... 340/435; 340/436; 340/903; 701/301

(58) Field of Classification Search ............... 340/435, 340/436, 463, 465, 466, 467, 901, 903; 342/70, 342/71; 701/45, 301; 180/167, 169
See application file for complete search history.

(56) References Cited

U.S. PATENT DOCUMENTS

| | | | | |
|---|---|---|---|---|
| 5,357,438 A * | 10/1994 | Davidian | ...................... | 701/301 |
| 6,014,601 A * | 1/2000 | Gustafson | ........................ | 701/45 |
| 6,282,483 B1 * | 8/2001 | Yano et al. | ...................... | 701/96 |
| 6,324,465 B1 * | 11/2001 | Teramura et al. | ............... | 701/96 |
| 6,504,473 B2 * | 1/2003 | Ichikawa et al. | ............... | 340/435 |
| 6,604,042 B2 * | 8/2003 | Maruko et al. | .................. | 701/96 |
| 2003/0009275 A1 * | 1/2003 | Koike | ............................. | 701/93 |
| 2003/0201878 A1 * | 10/2003 | Bai et al. | ........................ | 340/435 |
| 2007/0080793 A1 * | 4/2007 | Blase | ............................. | 340/435 |

* cited by examiner

*Primary Examiner* — Hung T. Nguyen
(74) *Attorney, Agent, or Firm* — Quinn Law Group, PLLC

(57) ABSTRACT

A vehicle has a safety system including at least one object sensor to detect a distance from an object in a path of the vehicle and the speed and acceleration of the object. The sensor data is input into a control to determine a desired braking judgment line and a steering judgment line between the vehicle and the object. The safety system then compares the vehicle and object acceleration. Following, the safety system calculates a judgment line between the object and the vehicle based upon equations for the determined scenario. The judgment line is then used to determine a warning distance and warn a vehicle operator.

16 Claims, 2 Drawing Sheets

JUDGMENT LINE CALCULATIONS FOR A VEHICLE SAFETY SYSTEM

TECHNICAL FIELD

The present invention relates generally to a vehicle safety system for automobiles, and more specifically to braking and steering determinations by a vehicle safety system.

BACKGROUND OF THE INVENTION

Conventional vehicle safety systems regulate vehicle speed according to a speed setting that a vehicle operator may set and adjust while driving. Adaptive cruise control systems detect moving objects in the vehicle path, such as preceding vehicles, and provide throttle and brake control, as necessary, to maintain a trailing distance from the preceding vehicle.

However, these systems do not take into account acceleration or deceleration of the host vehicle or the detected object. Due to the variety of situations which arise when accounting for changes in acceleration, prior vehicle safety systems cannot perform the calculations for all situations without null values occurring. Accordingly, these safety systems are programmed to maintain a trailing distance utilizing current vehicle velocity. These safety systems utilize velocity of the vehicle and performs the calculations frequently to take into account any changes in the velocity.

SUMMARY OF THE INVENTION

A vehicle safety system which determines a time until braking or steering must begin in order to avoid contact with an object, including accounting for the acceleration of the vehicle and the detected object, is desired.

A vehicle has a safety system including at least one object sensor to detect a distance from an object in a path of the vehicle and the speed and acceleration of the object. Additionally, at least one vehicle sensor determines a speed and acceleration of the vehicle. The sensor data is input into a control to determine a time until the vehicle must begin braking to avoid contact with the object (i.e. a "braking judgment line") and another time until the vehicle must begin steering to avoid contact with the object (i.e., a "steering judgment line") based upon the sensor information.

A method for determining a warning for the vehicle safety system includes initiating the safety system with at least one input from the sensors. The safety system then compares the vehicle acceleration and the object acceleration to determine a safety system scenario. Based upon the equations selected for the determined scenario the safety system calculates a judgment line between the object and the vehicle. The judgment line is then used to determine a warning distance and warn a vehicle operator.

The above features and advantages, and other features and advantages of the present invention will be readily apparent from the following detailed description of the preferred embodiments and best modes for carrying out the present invention when taken in connection with the accompanying drawings.

DESCRIPTION OF THE PREFERRED EMBODIMENTS

Figure 1:
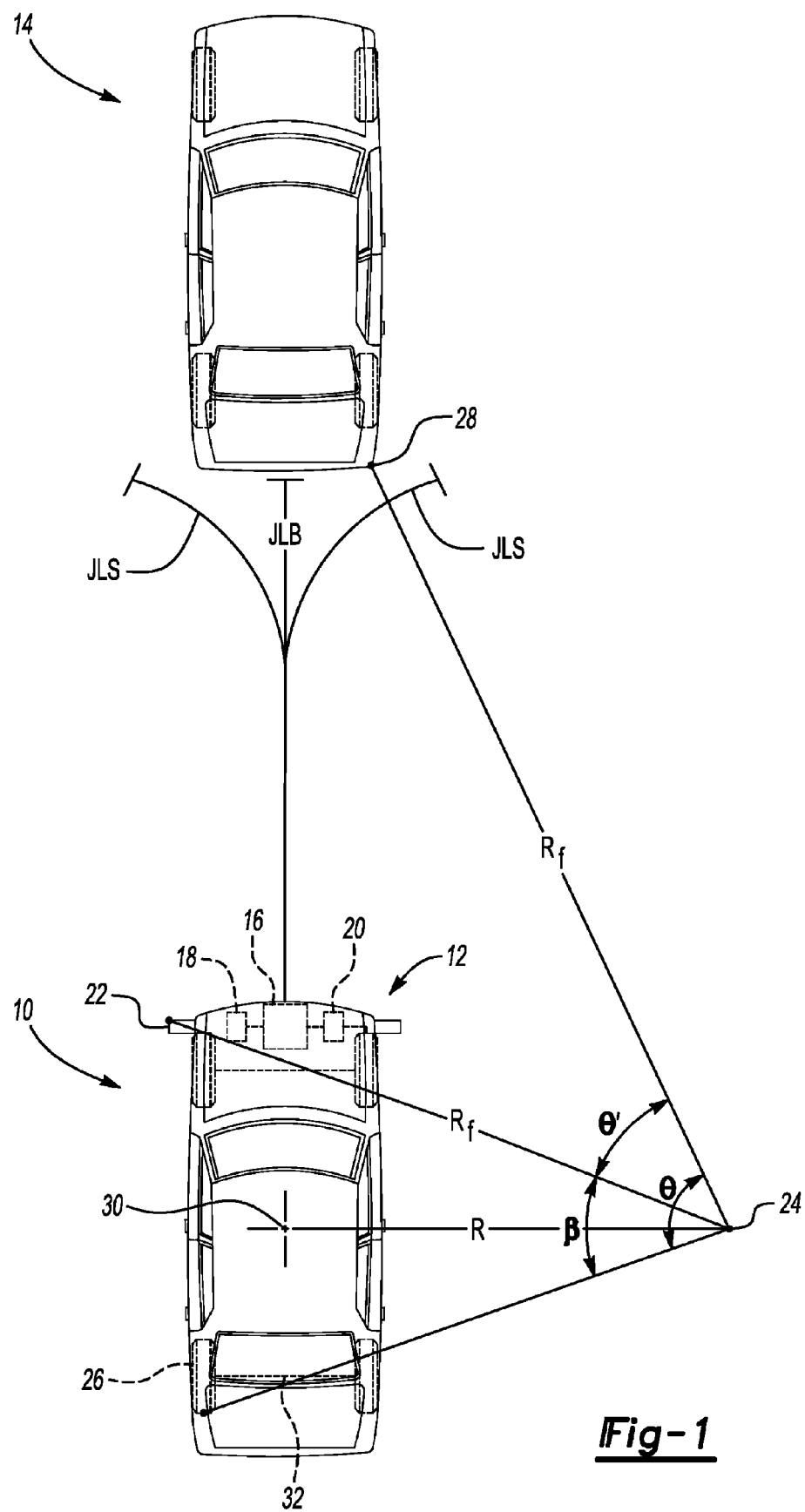
FIG. 1 is a schematic plan view illustrating a vehicle having a vehicle safety system and a target vehicle.

Referring to the Figures, wherein like reference numbers refer to the same or similar components throughout the several views, FIG. 1 is a schematic view of an exemplary motor vehicle, identified generally as 10, having a vehicle safety system 12. A preceding or target vehicle 14 is located on a roadway a distance ahead of the host vehicle 10.

A control 16 manages the vehicle safety system 12. The control 16 is connected to an object sensor 18 for detecting the distance between the host vehicle 10 and the target vehicle 14, and the speed and change in speed of the target vehicle 14. The sensor 18 may be any type of sensor that provides the required information or may incorporate multiple sensors each providing one type of information. For the purposes of simplification the embodiment illustrates a detected object as the target vehicle 14. Any object that would be located on the roadway with the host vehicle 10 would also be detected and subject to the vehicle safety system 12.

Additionally, the host vehicle 10 includes a speedometer 20 for measuring the speed of the host vehicle 10. Information from the speedometer 20 is sent to the control 16 for operation of the vehicle safety system 12.

A judgment line (JL) of the host vehicle 10 determines the latest possible time at which the host vehicle 10 should brake or steer to avoid contact with the target vehicle 14 (or an object). The control 16 for the vehicle safety system 12 calculates the judgment line (JL) for the host vehicle 10 in order to provide a vehicle operator with sufficient warning to avoid contact between the host vehicle 10 and the target vehicle 14.

The determination of the judgment line (JL) includes the determination of two times: a braking judgment line (JLB) determines the last possible moment when the host vehicle 10 should brake to avoid contact with the object/target vehicle 14, and a steering judgment line (JLS) determines the last possible moment when the host vehicle 10 should steer to avoid contact with the object/target vehicle 14. Both the JLB and JLS take into account vehicle characteristics such as, weight, center of gravity, turn radius of the vehicle, tires, braking system, etc.

Braking Judgment Line

The braking judgment line (JLB) is expressed as:

$$JLB = TTC - t',$$

where TTC is the time to contact and t' is the time to brake. In other words, the time to brake (t') is the time by which the host vehicle 10 must begin braking to reach the target velocity (Vt) with the target minimum gap (TMG) between the host vehicle 10 and the target vehicle 14. The target minimum gap (TMG) is the minimum distance desired between the host vehicle 10 and the target vehicle 14. A typical target minimum gap (TMG) is approximately 0.25 m. The target minimum gap (TMG) distance may be selected according to the host vehicle 10 configuration and driver standards. One skilled in the art would be able to select an appropriate target minimum gap (TMG).

When either of the vehicles are accelerating or decelerating, the time to contact (TTC) can be calculated by:

$$TTC = \frac{\Delta V}{(\Delta A)} \mp \sqrt{\frac{(\Delta V)^2 - 2X \ast (\Delta A)}{(\Delta A)^2}},$$

where X is the distance between the host vehicle 10 and the target vehicle 14, and $\Delta A$ is the difference in acceleration between the host vehicle 10 and the target vehicle 14. The difference in acceleration (ΔA) is calculated by:

$$\Delta A = At - Ah,$$

where $At$ is the acceleration/deceleration of the target vehicle 14 and $Ah$ is the acceleration/deceleration of the host vehicle 10. ΔV is the difference in velocity between the host vehicle 10 and the target vehicle 14. The difference in velocity (ΔV) can be calculated by $$\Delta V = h + Ah*t' - (Vt + At*t'),$$

where Vh is the velocity of the host vehicle 10 and Vt is velocity of the target vehicle 14.

Thus, when the host vehicle velocity (Vh) and the target vehicle velocity (Vt) have no difference in acceleration. (i.e. velocity of each vehicle is constant) the time to contact (TTC) can be simplified to:

$$TTC = \frac{X}{\Delta V}.$$

To calculate the time to brake (t') for determining the difference in velocity (ΔV) when at least one of the host vehicle 10 and the target vehicle 14 is accelerating and for determining the braking judgment line (JLB), the distance to brake (Bd) must first be calculated. The distance to brake (Bd) is the distance covered during the time to brake (t'), i.e. the distance covered prior to the last possible moment at which braking must occur. When the distance to brake (Bd) has been reached, the host vehicle 10 must begin braking to avoid contact with the target vehicle 14. The distance to brake (Bd) can be calculated by:

$$Bd = TMG + \Delta V * T_{brake} + \frac{(A\max - At)*(T_{brake})^2}{2}$$

where Amax is the maximum rate at which the host vehicle 10 can decelerate, and ΔV is taken at t' (see above equation for ΔV). Further, $T_{brake}$ is the time taken by the host vehicle 10 to attain the velocity of the target vehicle (Vt). That is, the time period after braking begins. $T_{brake}$ begins after time to brake (t') and distance to brake (Bd) have been reached. After the braking time ($T_{brake}$) is concluded, the target minimum gap (TMG) will remain between the host vehicle 10 and the target vehicle 14.

The braking time ($T_{brake}$) can be calculated by:

$$T_{brake} = \frac{-\Delta V - (\Delta A)*t'}{At - A\max}.$$

Substituting the above equation for the time to brake ($T_{brake}$) into the above equation for the distance to brake (Bd) the equation for the distance to brake (Bd) becomes:

$$Bd = TMG + \frac{-(\Delta V - \Delta A * t')^2}{2*(At - A\max)}.$$

Additionally, distance to brake (Bd) can also be calculated using the following equation:

$$Bd = X - \Delta V * t' + \frac{\Delta A * (t')^2}{2}.$$

By combining the previous equations for distance to brake (Bd), the time to brake (t') can be found. Because of the complexity of the equations and to avoid null values (e.g. values causing the calculations to become impossible for the control 16 to solve), the equations for time to brake (t') are simplified according to several operating scenarios.

The first scenario is when the host vehicle 10 has constant velocity and the target vehicle 14 has a constant velocity (i.e. for Ah=0, At=0), and the equation for time to brake (t') is:

$$t' = \frac{X}{\Delta V} + \frac{\Delta V}{2*A\max} - \frac{TMG}{\Delta V}.$$

Substituting this into the above equation for braking judgment line (JLB) determination, the equation below is reached:

$$JLB = \frac{TMG}{\Delta V} - \frac{\Delta V}{2*A\max}.$$

The second scenario is when the host vehicle 10 has constant velocity and the target vehicle 14 has a changing velocity (i.e. for Ah=0, At≠0), and the equations for time to brake (t') and braking judgment line (JLB) become:

$$t' = \frac{\Delta V}{At} \mp \left(\frac{(\Delta V)^2}{(At)^2} - \frac{\Delta V2 + 2(TMG - X)(At - A\max)}{At * A\max}\right)^{1/2};$$

$$JLB = -\left(\frac{(\Delta V)^2}{At^2} - \frac{2X}{At}\right)^{1/2} + \left(\frac{(\Delta V)^2}{At^2} - \frac{2(At - A\max)(TMG - X) + (\Delta V)^2}{At * A\max}\right)^{1/2}.$$

The third scenario is when the host vehicle 10 has changing velocity and the target vehicle 14 has constant velocity (i.e. for Ah≠0 and At=0), and the equations for time to brake (t') and braking judgment line (JLB) become:

$$t' = -\frac{\Delta V}{Ah} \mp \left(\frac{A\max * (\Delta V)^2 - 2*Ah*(TMG - X)}{Ah*(A\max - Ah)}\right)^{1/2};$$

$$JLB = -\left(\frac{(\Delta V)^2 + 2*X*Ah}{(Ah)^2}\right)^{1/2} + \left(\frac{Adec*(\Delta V)^2 - 2*Ah*(TMG - X)}{Ah*(A\max - Ah)}\right)^{1/2}.$$

Finally, the fourth scenario is when the host vehicle 10 and the target vehicle 14 both have changing velocity (i.e. for Ah≠0 and At≠0), and the equations for time to brake (t') and braking judgment line (JLB) become:

$$t' = -\frac{\Delta V}{\Delta A} \mp \frac{1}{\Delta A}\left(\frac{(A\max - At)*((\Delta V)^2 + 2X*\Delta A)}{(A\max - Ah)}\right)^{1/2};$$

$$JLB =$$

-continued $$-\left(\frac{(\Delta V)^2 + 2*X*\Delta A}{2*(A\max - Ah)^2}\right)^{1/2} \mp \frac{1}{\Delta A}\left(\frac{(A\max - At)*((\Delta V)^2 + 2X*\Delta A)}{(A\max - Ah)}\right)^{1/2}.$$

Using the calculated JLB and working in a time delay based upon the time taken to reach maximum deceleration (Amax) a warning distance (Dwarn) can be calculated by:

$$D\text{warn} = X - \Delta V * (TTC - JLB - WTM)$$

where WTM is the warn time margin. In other words, the amount of time after which the operator of the host vehicle 10 must be warned in order to allow the target minimum gap (TMG) after the braking time ($T_{brake}$) is complete. The warn time margin (WTM) takes into account the amount of time it will take the operator and the host vehicle 10 to respond to the warning. An approximate warning time margin (WTM) is 0.8 sec. Adding the warn time margin (WTM) and the JLB time together gives the warning time (Twarn) or the amount of time prior to collision at which the driver should be warned.

Steering Judgment Line

Similar calculations can be completed for the steering judgment line (JLS). For example, the steering judgment line (JLS) can be calculated by:

$$JLS = TTC - St',$$

where St' is the time after which the host vehicle 10 must begin steering, or turn, to avoid contact with the target vehicle 14. The time to contact (TTC) is calculated in the same manner as described above, using the time to steer (St') in the equations rather than the time to brake (t'). The time to steer (St') for determining the time to contact (TTC) and the steering judgment line (JLS) is calculated by:

$$St' = \frac{X - Sd}{\Delta V}.$$

As above, X is the distance between the host vehicle 10 and the target vehicle 14. Sd is the distance traveled until the time to steer (St'). That is, the distance that will be traveled until steering must begin. When the distance to steer (Sd) has been reached the host vehicle 10 must begin steering (i.e. turning to avoid the target vehicle 14). The distance to steer (Sd) can be calculated by determining how much forward distance will be required for the host vehicle 10 to turn and taking into account the distance the target vehicle 14 will travel in the same amount of time. Thus, the distance to steer (Sd) can be calculated by:

$$Sd = Xh - Xt,$$

where Xh is the distance, forward, the host vehicle 10 has traveled after they begin turning. Xt is the distance the target vehicle 14 has traveled after the host vehicle 10 began turning. The host vehicle 10 forward travel distance (Xh) can be calculated by:

$$Xh = Rf \sin \Theta - L,$$

where L is the wheelbase of the host vehicle 10. Rf is the radius from the outer edge of the side mirror 22 of the host vehicle 10 to the center 24 of the turn, shown in FIG. 1. $\Theta$ is the angle formed between the host vehicle 10 and the target vehicle 14 at the center 24 of the turn, illustrated in FIG. 1.

The angle to furthest tire ($\Theta$) is calculated using the outer edge of the furthest tire. That is, the rear wheel 26 of the host vehicle 10 to the center 24 of the turn and a rear corner 28 of the target vehicle 14 to the center 24 of the turn. Incidentally, the distance from the rear corner 28 of the target vehicle 14 to the center 24 of the turn for the host vehicle 10 is the same distance as the distance from the outer edge of the side mirror 22 of the host vehicle 10 to the center 24 of the turn, Rf.

The angle to furthest tire ($\Theta$) is calculated by:

$$Rf \cos \Theta = Ravg;$$

where Ravg is the average radius from the host vehicle 10 to the center 24 of the turn. The average radius from the host vehicle 10 (Ravg) can be expressed by:

$$Ravg = \sqrt{(Rf)^2 - L^2}.$$

Substituting this into the above equation and solving for the angle to furthest tire ($\Theta$) we get:

$$\Theta = \cos^{-1}\left(\frac{((Rf)^2 - L^2)^{1/2} + \frac{Vh}{Rf}}{Rf}\right).$$

The radius to side mirror (Rf) can be calculated by:

$$Rf = \frac{L}{\sin \delta f}.$$

$\delta f$ is the slip angle for the tires of the host vehicle 10. Slip angle ($\delta f$) is calculated by:

$$\delta f = \sin^{-1} \frac{1}{\sqrt{\frac{\left(\sqrt{R^2 - b^2} + \frac{w}{2}\right)^2}{L^2} + 1}};$$

where b is the distance between the center of gravity 30 and the rear axle 32 of the host vehicle 10 and w is the track width of the host vehicle 10. R is the radius from the center of gravity 30 to the turn center 24, illustrated in FIG. 1 and represented by the equation:

$$R = \frac{(Vh)^2}{G};$$

where G is the center of gravity 30 of the host vehicle 10. By substituting the equations for slip angle ($\delta f$) and radius to center of gravity (R) back into the equation above for the radius to side mirror (Rf), the following equation results:

$$Rf = \sqrt{\left((R^2 - b^2)^{1/2} + \frac{w}{2}\right)^2 + L^2}.$$

By adding this to the equation for the angle to furthest tire ($\Theta$) we get:

$$\Theta = \sin^{-1} \sqrt{\frac{L^2 + 2w\sqrt{R^2 - b^2}}{L^2 + \left(\sqrt{R^2 - b^2} + \frac{w}{2}\right)^2}}.$$

Going back to the equation for distance to steer (Sd), we must still determine distance the target vehicle has traveled (Xt). The distance the target vehicle has traveled (Xt) can be calculated by:

$$Xt = Vt * Tturn$$

where Tturn is the time required to turn the host vehicle 10. In other words the time from when the host vehicle 10 begins turning until the host vehicle 10 has reached the target minimum gap (TMG). The time to turn (Tturn) can be calculated by:

$$Tturn = \frac{Rf * \Theta'}{Vh}.$$

Where Θ' is the angle formed from the outer edge of the side mirror 22 of the host vehicle 10 to the center 24 of the turn and from the target vehicle 14 and the center 24 of the turn, illustrated in FIG. 1. The angle from the side mirror (Θ') can be calculated by:

$$\Theta' = \Theta - B;$$

where B is the angle formed from the outer edge of the side mirror 22 of the host vehicle 10 to the center 24 of the turn and the rear wheel 26 of the host vehicle 10 to the center 24 of the turn, illustrated in FIG. 1. We know that:

$$Rf \sin B = L.$$

Thus, knowing the wheelbase (L) and the radius (Rf) from the rear tire 26 to the turn center 24 we can substitute these values and solve for difference in angles (B) the equation becomes:

$$B = \sin^{-1} \frac{L}{\sqrt{L^2 + \left(\sqrt{R^2 - b^2} + \frac{l}{2}\right)^2}}.$$

Knowing the difference in angles (B) and the previously calculated value angle to furthest tire (Θ) we can now calculate the target vehicle forward travel (Xt). Thus, by combining these equations we can solve for distance to steer (Sd):

$$Sd = Rf \sin\Theta - L - Vt\left(\frac{Rf * \Theta'}{Vh}\right).$$

Using the above equation of distance to steer (Sd) the time to steer (St') can be found:

$$St' = \frac{X - Rf \sin\Theta - L - Vt\left(\frac{Rf * \Theta'}{Vh}\right)}{\Delta V}.$$

This can be plugged into the above equation (JLS=TTC−St') for determining steering judgment line (JLS). Again the calculations for time to contact (TTC), time to steer (St') and steering judgment line (JLS) can be simplified for each of the scenarios above, relating to acceleration of the host vehicle 10 and target vehicle 14, for input into the control 16. By separating and simplifying the above equations for each scenario any null inputs for the control 16 may be avoided.

Figure 2:
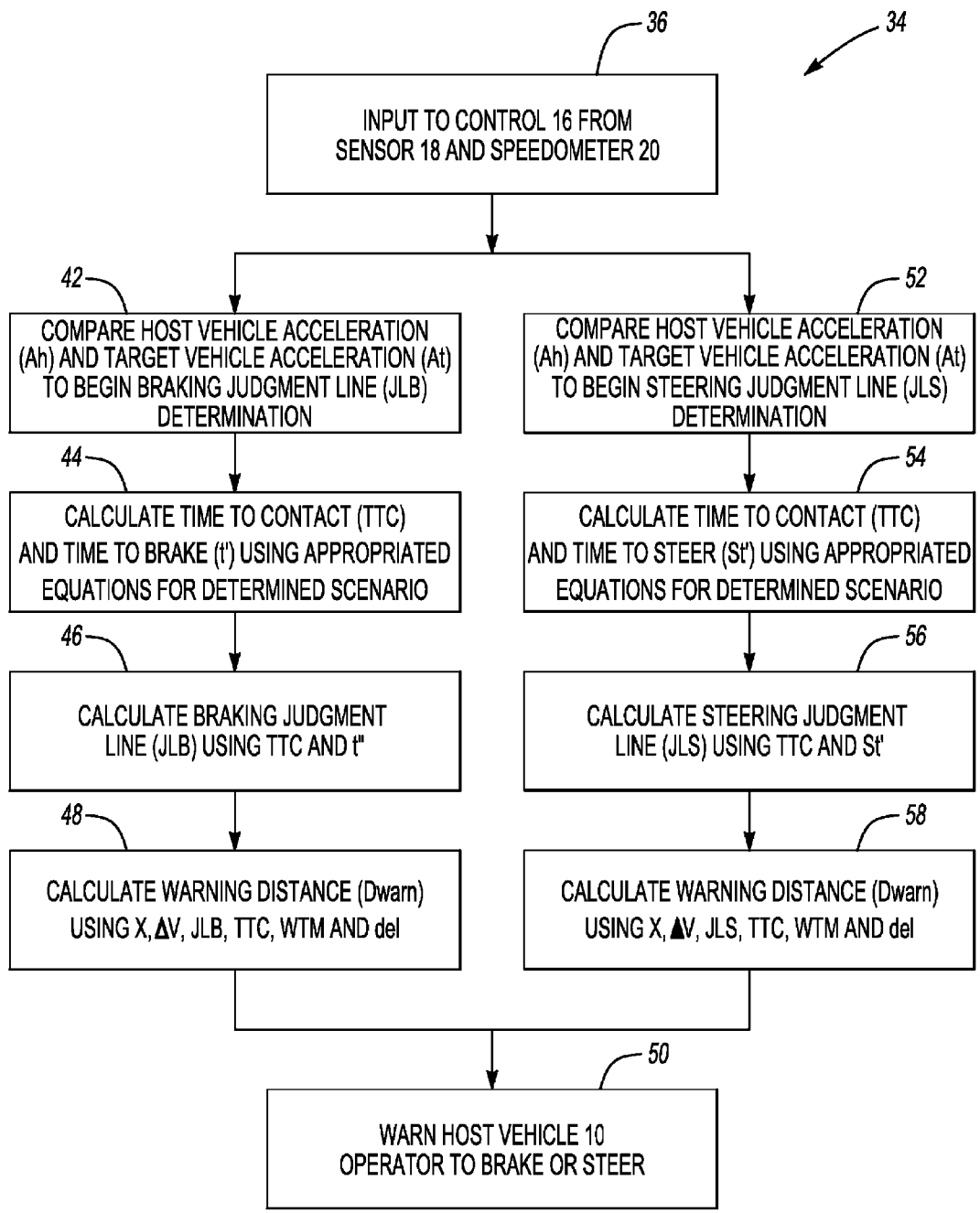
FIG. 2 is a flow diagram illustrating a method for determining a braking judgment line and a steering judgment line for the vehicle safety system of FIG. 1.

FIG. 2 illustrates a summary of the process 34 used by the control 16. The control 16 receives input from the sensors 18, such as an indication that an object is detected in the path of the host vehicle 10, and input from the speedometer 20, in step 36. The control 16 then begins either the braking judgment line (JLB) determination or the steering judgment line (JLS) determination. Additionally, the control 16 may have the capability of performing both determinations simultaneously. For the braking judgment line (JLB) determination, the control 16 compares the acceleration of the host vehicle (Ah) and target vehicle acceleration (Ah) to determine which equations to use, step 42. Then, using the appropriate equations the control 16 calculates the time to contact (TTC) and time to brake (t'), step 44. The calculated time to contact (TTC) and time to brake (t') are used to calculate the braking judgment line (JLB), step 46. Using the determined braking judgment line (JLB) the control 16 calculates a warning distance, step 48. The control 16 at the appropriate time initiates a warning signal to the operator of the host vehicle 10, step 50. The warning signal may be, but is not limited to, an audio signal, visual signal, or any combination of these.

Alternately, or in addition to, the control 16 begins the steering judgment line (JLS) determination, by comparing the host vehicle acceleration (Ah) and target vehicle acceleration (Ah) to determine which equations to use, step 52. Then, using the appropriate equations the control 16 calculates the time to contact (TTC) and time to steer (St'), step 54. The calculated time to contact (TTC) and time to steer (St') are used to calculate the steering judgment line (JLS), step 56. Using the determined steering judgment line (JLS) the control 16 determines a warning distance, step 58. The control at the appropriate time initiates a warning signal to the operator of the host vehicle 10, step 50.

The control 16 may warn the vehicle operator of both the brake warning distance (Dwarn) and the steering warning distance (SDwarn). Alternately, the step 50 of warning the vehicle operator can also include a comparison of the brake warning distance (Dwarn) with the steering warning distance (SDwarn). The control 16 can then warn the vehicle operator based upon the warning distance (Dwarn or SDwarn) that is the furthest point. That is, the last possible distance at which the vehicle can brake or steer. In this instance, the safety system 12 must distinguish between the brake warning and the steer warning such that the vehicle operator will know the appropriate action required (i.e., the warnings must be distinguishable to the vehicle operator).

While the best modes for carrying out the invention have been described in detail, those familiar with the art to which this invention relates will recognize various alternative designs and embodiments for practicing the invention within the scope of the appended claims.

The invention claimed is:

1. A method for determining a warning for a vehicle safety system using a controller comprising:

initiating the safety system with at least one input;

comparing via the controller a vehicle acceleration and an object acceleration and selecting from a set of predetermined equations based upon the compared accelerations;

calculating via the controller an amount of time to perform each of braking and steering to avoid contact with the object using the selected predetermined equations;

determining a distance between the vehicle and the object at which a warning must be conveyed to the vehicle operator, at least partially based upon the shorter one of the calculated amount of time of braking and steering; and warning a vehicle operator based upon the determined distance to perform the one of braking and steering.

2. The method of claim 1, wherein the initiating the safety system further comprises detecting an object with a sensor.

3. The method of claim 1, wherein the calculating an amount of time further comprises calculating an amount of time to brake and an amount of time to contact with the object.

4. The method of claim 1, wherein the calculating an amount of time further comprises calculating an amount of time to steer and an amount of time to contact with the object.

5. The method of claim 1, wherein determining the distance between the vehicle and the object at which the warning must be conveyed further includes determining a first distance and a second distance, and wherein warning the vehicle operator further includes warning the vehicle operator at both the first distance based upon the longer one of the time to perform braking and steering and the second distance based upon the shorter one of the time to perform braking and steering.

6. The method of claim 1, wherein warning the vehicle operator includes using a first type of warning signal to warn the vehicle operator to perform braking and a second type of warning signal to warn the vehicle operator to perform steering, such that the warning signal is configured to distinguish between a warning to brake and a warning to steer.

7. A method for determining a warning for a vehicle safety system using a controller comprising:
   initiating the safety system with at least one input;
   comparing via the controller a vehicle acceleration and an object acceleration and selecting from a set of predetermined equations based upon the compared accelerations;
   calculating via the controller an amount of time to perform at least one of braking and steering to avoid contact with the object using the selected predetermined equations;
   determining a distance between the vehicle and the object at which a warning must be conveyed to the vehicle operator, at least partially based upon the calculated amount of time;
   warning a vehicle operator to perform the one of braking and steering; and
   wherein the set of predetermined equations include equations based on: the vehicle velocity being constant and the object velocity being constant; the vehicle velocity being constant and the object velocity being not constant; the vehicle velocity being not constant and the object velocity being constant; and the vehicle velocity being not constant and the object velocity being not constant.

8. A method for determining a warning for a vehicle safety system using a controller comprising:
   initiating the safety system with at least one input;
   comparing via the controller a vehicle acceleration and an object acceleration and selecting from a set of predetermined equations for an applicable safety system scenario based upon the compared accelerations;
   calculating via the controller a first amount of time until contact between the object and the vehicle based upon equations for the determined applicable safety system scenario;
   calculating via the controller a second amount of time until contact between the object and the vehicle based upon equations for the determined applicable safety system scenario;
   determining a warning distance based upon the calculated first and second amounts of time; and
   warning a vehicle operator based upon the determined warning distance.

9. The method of claim 8, wherein the initiating the safety system further comprises detecting an object in a vehicle path with a sensor.

10. The method of claim 8, wherein the calculating the first amount of time further comprises calculating a time to brake and a time to contact.

11. The method of claim 8, wherein the calculating the second amount of time further comprises calculating a time to steer and a time to contact.

12. The method of claim 8, wherein the determining the warning distance further comprises:
    calculating a braking warning distance;
    calculating a steering warning distance; and
    comparing the braking warning distance to the steering warning distance to determine a desired warning distance.

13. The method of claim 12, wherein the desired warning distance is the farther distance of the braking warning distance and the steering warning distance.

14. The method of claim 8, wherein the determined applicable safety system scenario is based on one of: the vehicle velocity being constant and the object velocity being constant; the vehicle velocity being constant and the object velocity being not constant; the vehicle velocity being not constant and the object velocity being constant; and the vehicle velocity being not constant and the object velocity being not constant.

15. The method of claim 8, wherein determining the warning distance based upon the calculated first and second amounts of time further includes determining a first warning distance and a second warning distance, and wherein warning the vehicle operator further includes warning the vehicle operator at both the first warning distance and the second warning distance.

16. The method of claim 8, wherein warning the vehicle operator includes using a first type of warning signal to warn the vehicle operator to perform braking and a second type of warning signal to warn the vehicle operator to perform steering, such that the warning signal is configured to distinguish between a warning to brake and a warning to steer.

* * * * *